US007997367B2

(12) United States Patent
Nakamura

(10) Patent No.: US 7,997,367 B2
(45) Date of Patent: Aug. 16, 2011

(54) ASSEMBLED BATTERY AND VEHICLE

(75) Inventor: Yoshiyuki Nakamura, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 515 days.

(21) Appl. No.: 12/294,749

(22) PCT Filed: Apr. 11, 2007

(86) PCT No.: PCT/JP2007/058385
§ 371 (c)(1),
(2), (4) Date: Sep. 26, 2008

(87) PCT Pub. No.: WO2007/132621
PCT Pub. Date: Nov. 22, 2007

(65) Prior Publication Data
US 2010/0163325 A1    Jul. 1, 2010

(30) Foreign Application Priority Data
May 11, 2006    (JP) .................................. 2006-132905

(51) Int. Cl.
*B60R 16/04*    (2006.01)
(52) U.S. Cl. ....................................... 180/68.5; 429/148
(58) Field of Classification Search ................. 180/68.5; 429/71, 120, 148
See application file for complete search history.

(56) References Cited

U.S. PATENT DOCUMENTS

| | | | |
|---|---|---|---|
| 4,578,324 A | 3/1986 | Koehler et al. | |
| 6,220,383 B1 * | 4/2001 | Muraki et al. | 180/68.5 |
| 6,541,151 B2 * | 4/2003 | Minamiura et al. | 429/98 |
| 6,662,891 B2 * | 12/2003 | Misu et al. | 180/68.1 |
| 7,526,346 B2 * | 4/2009 | Kolodziej | 700/45 |
| 7,560,190 B2 * | 7/2009 | Ahn et al. | 429/120 |
| 7,618,740 B2 * | 11/2009 | Hamada et al. | 429/120 |
| 7,642,002 B2 * | 1/2010 | Hamery et al. | 429/120 |
| 7,654,351 B2 * | 2/2010 | Koike et al. | 180/68.5 |
| 7,662,508 B2 * | 2/2010 | Lee et al. | 429/120 |
| 7,678,494 B2 * | 3/2010 | Tsuchiya | 429/120 |
| 7,771,865 B2 * | 8/2010 | Takasaki et al. | 429/83 |

(Continued)

FOREIGN PATENT DOCUMENTS
FR    2 694 136 A1    1/1994
(Continued)

OTHER PUBLICATIONS

Supplementary European Search Report dated Feb. 23, 2011.

*Primary Examiner* — Jeffrey J Restifo
(74) *Attorney, Agent, or Firm* — Kenyon & Kenyon LLP

(57) ABSTRACT

In an assembled battery used as a power source of a vehicle, a negative electrode collector plate and a positive electrode collector plate are arranged at every two bipolar secondary batteries adjacent in a stacking direction among a plurality of bipolar electrodes. The negative electrode collector plate and the positive electrode collector plate also function as heat radiating members, as a cooling medium is caused to flow therein. It becomes unnecessary to connect a cooling tab to the positive electrode collector plate (or the negative electrode collector plate) to cool the assembled battery and, therefore, no portion protrudes from the positive electrode collector plate (or the negative electrode collector plate) of the assembled battery. Thus, the inside of assembled battery can be cooled while reducing the size of the assembled battery.

8 Claims, 7 Drawing Sheets

U.S. PATENT DOCUMENTS

| | | | |
|---|---|---|---|
| 7,810,596 B2* | 10/2010 | Tsuchiya | 180/68.5 |
| 7,892,671 B2* | 2/2011 | Hamery et al. | 429/120 |
| 7,900,727 B2* | 3/2011 | Shinmura | 180/68.1 |
| 2001/0026887 A1* | 10/2001 | Minamiura et al. | 429/120 |
| 2003/0008205 A1 | 1/2003 | Horie et al. | |
| 2007/0015049 A1* | 1/2007 | Hamada et al. | 429/120 |
| 2008/0047767 A1* | 2/2008 | Tsuchiya | 180/68.5 |
| 2008/0196957 A1* | 8/2008 | Koike et al. | 180/68.5 |
| 2009/0173559 A1* | 7/2009 | Nakamura | 180/68.5 |
| 2009/0260905 A1* | 10/2009 | Shinmura | 180/68.1 |
| 2009/0305124 A1* | 12/2009 | Ahn et al. | 429/120 |
| 2010/0055553 A1* | 3/2010 | Kimura | 429/120 |
| 2010/0059299 A1* | 3/2010 | Hoermandinger et al. | 180/65.21 |
| 2010/0062328 A1* | 3/2010 | Takagi | 429/120 |
| 2010/0071980 A1* | 3/2010 | Kokaji et al. | 180/68.5 |
| 2010/0089675 A1* | 4/2010 | Nagata et al. | 180/68.5 |
| 2010/0163325 A1* | 7/2010 | Nakamura | 180/68.5 |
| 2010/0203376 A1* | 8/2010 | Choi et al. | 429/120 |
| 2010/0236854 A1* | 9/2010 | Nakamura | 180/68.5 |
| 2010/0297486 A1* | 11/2010 | Fujii | 429/120 |
| 2010/0310918 A1* | 12/2010 | Yun et al. | 429/120 |
| 2011/0059346 A1* | 3/2011 | Jeong et al. | 429/120 |
| 2011/0076540 A1* | 3/2011 | Ronning et al. | 429/120 |

FOREIGN PATENT DOCUMENTS

| | | |
|---|---|---|
| JP | 10-106521 | 4/1998 |
| JP | 11-144771 | 5/1999 |
| JP | 2000-30746 A | 1/2000 |
| JP | 2000-100471 A | 4/2000 |
| JP | 2000-195480 A | 7/2000 |
| JP | 2003-17127 A | 1/2003 |
| JP | 2003-288863 A | 10/2003 |
| JP | 2004-63397 A | 2/2004 |
| JP | 2004-127559 A | 4/2004 |
| JP | 2004-139775 A | 5/2004 |
| JP | 2004-158222 A | 6/2004 |
| JP | 2005-71784 A | 3/2005 |
| JP | 2005-302698 A | 10/2005 |
| JP | 2005-353536 A | 12/2005 |

* cited by examiner

US 7,997,367 B2

ASSEMBLED BATTERY AND VEHICLE

This is a 371 national phase application of PCT/JP2007/058385 filed 11 Apr. 2007, claiming priority to Japanese Patent Application No. 2006-132905 filed 11 May 2006, the contents of which are incorporated herein by reference.

TECHNICAL FIELD

The present invention relates to an assembled battery and a vehicle provided with the assembled battery and, more specifically, to an assembled battery formed by stacking a plurality of bipolar secondary batteries as well as to a vehicle provided with the assembled battery.

BACKGROUND ART

In connection with a cooling structure of a conventional secondary battery, by way of example, Japanese Patent Laying-Open No. 2005-71784 discloses a structure of a stacked type battery having a plurality of unit batteries stacked in series, in which a cooling tab is attached to a plurality of collectors. Each of the unit batteries is formed by connecting in series a collector having a positive electrode active material on one surface and a negative electrode active material on the rear surface, to another collector, with a polymer electrolyte posed therebetween. In the stacked type battery, surface area, thickness or the like of the cooling tabs is adjusted such that heat radiating effect of the cooling tab at the center of thickness in stacking becomes the highest and the heat radiating effect of cooling tab decreases toward opposite ends in the thickness direction.

In the stacked type battery described above, the cooling tab protrudes from the collector. Specifically, in the stacked type battery described above, widthwise length of the battery unavoidably increases as the cooling tab is provided. Japanese Patent Laying-Open No. 2005-71784 does not specifically disclose any specific solution to such a problem.

DISCLOSURE OF THE INVENTION

An object of the present invention is to provide an assembled battery of reduced size allowing cooling of its inside, as well as to provide a vehicle provided with such a battery.

In summary, the present invention provides an assembled battery, including a plurality of secondary batteries stacked together. Each of the plurality of secondary batteries includes a plurality of bipolar electrodes stacked in the same direction as the stacking direction of the plurality of secondary batteries. Each of the plurality of bipolar electrodes has a positive electrode formed on a first main surface and a negative electrode formed on a second main surface. Each of the secondary batteries further includes a plurality of electrolytes provided for every two adjacent ones of the plurality of bipolar electrodes, and arranged between the positive electrode of one of the two adjacent bipolar electrodes and the negative electrode of the other one of the two adjacent bipolar electrodes. The assembled battery further includes a heat radiating member arranged to form a first cooling passage allowing flow of a cooling medium, between at least one pair of adjacent first and second secondary batteries, among the plurality of secondary batteries.

Preferably, the heat radiating member is electrically conductive. The positive electrodes of the first and second secondary batteries, or the negative electrodes of the first and second secondary batteries are electrically connected by the heat radiating member.

Preferably, the assembled battery further includes another heat radiating member arranged to form a second cooling passage allowing flow of a cooling medium, between the second secondary battery and a third secondary battery positioned opposite to the first secondary battery with respect to the second secondary battery and adjacent to the second secondary battery among the plurality of secondary batteries.

More preferably, the heat radiating member is arranged relative to a cooling apparatus supplying the cooling medium such that the cooling medium from the cooling apparatus flows through the first cooling passage in a first direction. The another heat radiating member is arranged relative to the cooling apparatus such that the cooling medium from the cooling apparatus flows through the second cooling passage in a second direction, opposite to the first direction.

Preferably, the assembled battery further includes a casing housing the plurality of secondary batteries, the heat radiating member and the another heat radiating member. A plurality of heat radiating fins are provided on an outer wall of the casing.

Preferably, the plurality of electrolytes are solid electrolyte or gelled electrolyte.

According to another aspect, the present invention provides an assembled battery, including a secondary battery. The secondary battery includes a plurality of bipolar electrodes stacked together. Each of the plurality of bipolar electrodes has a positive electrode formed on a first main surface and a negative electrode formed on a second main surface. The secondary battery further includes a plurality of electrolytes provided for every two adjacent ones of the plurality of bipolar electrodes, and arranged between the positive electrode of one of the two adjacent bipolar electrodes and the negative electrode of the other one of the two adjacent bipolar electrodes. The assembled battery further includes a heat radiating member arranged to form a first cooling passage allowing flow of a cooling medium, along that one of the plurality of bipolar electrodes which is arranged on one end in the stacking direction.

Preferably, an insulating member is arranged between the secondary battery and the heat radiating member. The secondary battery and the heat radiating member are formed to have a spiral shape about a prescribed axis.

More preferably, the heat radiating member is molded in a spiral shape in advance.

Preferably, the assembled battery further includes another heat radiating member forming a second cooling passage allowing flow of a cooling medium along that one of the plurality of bipolar electrodes which is arranged at the other end of the stacking direction, and an insulating member arranged opposite to the bipolar electrode arranged at the other end, with respect to the another heat radiating member. The secondary battery, the heat radiating member, the another heat radiating member and the insulating member are formed to a spiral about a prescribed axis.

According to a still further aspect, the present invention provides a vehicle, including a seat arranged in a vehicle interior, and an assembled battery arranged below the seat. The assembled battery includes a plurality of secondary batteries stacked together. Each of the plurality of secondary batteries has a plurality of bipolar electrodes stacked in the same direction as the stacking direction of the plurality of secondary batteries. The plurality of bipolar electrodes each have a positive electrode formed on a first main surface and a negative electrode formed on a second main surface. Each of the plurality of secondary batteries further has a plurality of electrolytes provided for every two adjacent ones of the plurality of bipolar electrodes, and arranged between the positive electrode of one of the two adjacent bipolar electrodes and the negative electrode of the other one of the two adjacent bipolar electrodes. The assembled battery further includes a heat radiating member arranged to form a first cooling passage allowing flow of a cooling medium, between at least one pair of adjacent first and second secondary batteries, among the plurality of secondary batteries.

Preferably, the heat radiating member is electrically conductive. The positive electrodes of the first and second secondary batteries, or the negative electrodes of the first and second secondary batteries are electrically connected by the heat radiating member.

Preferably, the assembled battery further includes another heat radiating member arranged to form a second cooling passage allowing flow of a cooling medium, between the second secondary battery and a third secondary battery positioned opposite to the first secondary battery with respect to the second secondary battery and adjacent to the second secondary battery among the plurality of secondary batteries.

More preferably, the heat radiating member is arranged relative to a cooling apparatus supplying the cooling medium such that the cooling medium from the cooling apparatus flows through the first cooling passage in a first direction, and the another heat radiating member is arranged relative to the cooling apparatus such that the cooling medium from the cooling apparatus flows through the second cooling passage in a second direction, opposite to the first direction.

More preferably, the assembled battery further includes a casing housing the plurality of secondary batteries, the heat radiating member and the said another heat radiating member. A plurality of heat radiating fins are provided on an outer wall of the casing.

Preferably, the plurality of electrolytes are solid electrolyte or gelled electrolyte.

According to a still further aspect, the present invention provides a vehicle, including a seat arranged in a vehicle interior, and an assembled battery arranged below the seat. The assembled battery includes a secondary battery. The secondary battery has a plurality of bipolar electrodes stacked together. Each of the plurality of bipolar electrodes has a positive electrode formed on a first main surface and a negative electrode formed on a second main surface. The secondary battery further has a plurality of electrolytes provided for every two adjacent ones of the plurality of bipolar electrodes, and arranged between the positive electrode of one of the two adjacent bipolar electrodes and the negative electrode of the other one of the two adjacent bipolar electrodes. The assembled battery further includes a heat radiating member arranged to form a first cooling passage allowing flow of a cooling medium, along that one of the plurality of bipolar electrodes which is arranged on one end in the stacking direction.

Preferably, an insulating member is arranged between the secondary battery and the heat radiating member. The secondary battery and the heat radiating member are formed to have a spiral shape about a prescribed axis.

More preferably, the heat radiating member is molded in a spiral shape in advance.

Preferably, the assembled battery further includes another heat radiating member forming a second cooling passage allowing flow of a cooling medium along that one of the plurality of bipolar electrodes which is arranged at the other end of the stacking direction, and an insulating member arranged opposite to the bipolar electrode arranged at the other end, with respect to the said another heat radiating member. The secondary battery, the heat radiating member, the another heat radiating member and the insulating member are formed to a spiral about a prescribed axis.

Therefore, according to the present invention, cooling of the inside of assembled battery becomes possible while reducing the size of the assembled battery.

BEST MODES FOR CARRYING OUT THE INVENTION

Figure 1:
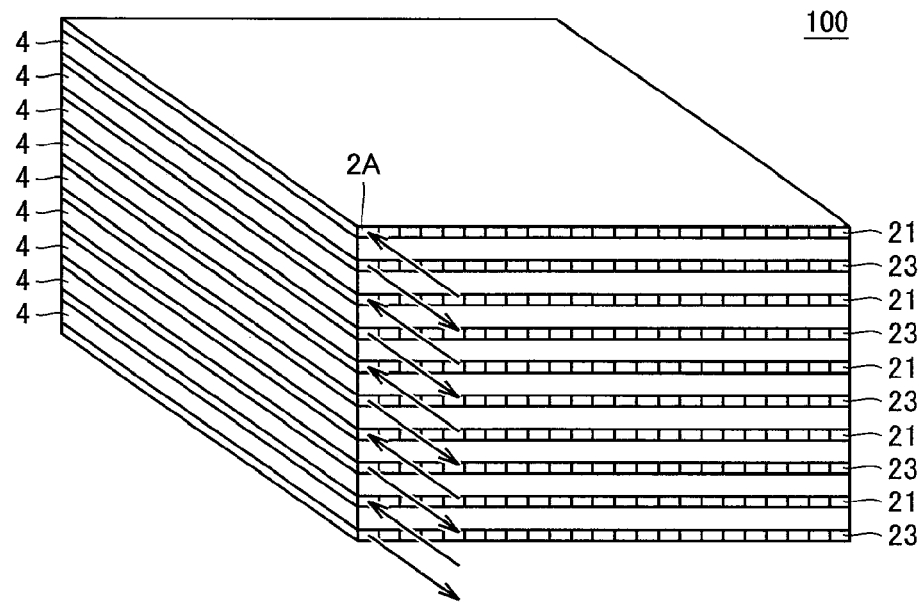
FIG. 1 is a perspective view showing the assembled battery in accordance with an embodiment of the present invention.

In the following, embodiments of the present invention will be described in detail with reference to the figures. Throughout the figures, the same or corresponding portions are denoted by the same reference characters.

Embodiment 1

FIG. 1 is a perspective view showing an assembled battery in accordance with an embodiment of the present invention.

Referring to FIG. 1, an assembled battery 100 includes a plurality of bipolar secondary batteries 4 stacked one after another. As will be described in detail later, each of the plurality of bipolar secondary batteries 4 includes a plurality of bipolar electrodes and a plurality of electrolytes. The plurality of bipolar electrodes are staked in the same direction as the stacking direction of the plurality of bipolar secondary batteries 4. On a first main surface of each of the bipolar electrodes, a positive electrode is formed. On a second main surface of each of the plurality of bipolar electrodes, a negative electrode is formed. Specifically, positive electrode and negative electrode are respectively formed on opposite surfaces of each bipolar electrode.

The plurality of electrolytes are formed for every two adjacent bipolar electrodes, among the plurality of bipolar electrodes. Each electrolyte is arranged between the positive electrode of one of the two adjacent bipolar electrodes and the negative electrode of the other one of the two adjacent bipolar electrodes.

Assembled battery 100 further includes a plurality of negative electrode collector plates 21 and a plurality of positive electrode collector plates 23. As shown in FIG. 1, the plurality of bipolar secondary batteries 4, the plurality of negative electrode collector plates 21 and the plurality of positive electrode collector plates 23 are stacked from the bottom to the top of assembled battery 100, in the order of positive electrode collector plate 23, bipolar secondary battery 4 and negative electrode collector plate 21.

The negative electrodes of the two bipolar secondary batteries 4 arranged above and below one negative electrode collector plate 21 are electrically connected to each other by the negative electrode collector plate 21. The positive electrodes of the two bipolar secondary batteries 4 arranged above and below one positive electrode collector plate 23 are electrically connected to each other by the positive electrode collector plate 23. Thus, the plurality of bipolar secondary batteries 4 are electrically connected in parallel. Therefore, according to the present embodiment, assembled battery 100 comes to have high capacity.

In bipolar secondary battery 4, the length in the stacking direction of the plurality of bipolar electrodes (thickness of bipolar secondary batteries 4) is significantly shorter than the length and width of the plane orthogonal to the stacking direction. By way of example, when the length in the stacking direction of the plurality of electrode sheets in each bipolar secondary battery 4 is assumed to be 1, the shorter or longer side of the plane mentioned above has the length of about 10 to about 15. As the plurality of bipolar secondary batteries 4 are stacked in the same direction as the stacking direction of the plurality of bipolar electrodes contained in each bipolar secondary battery 4, increase in size of the assembled battery can be prevented while attaining higher battery capacity.

In each of the plurality of negative electrode collector plates 21 and the plurality of positive electrode collector plates 23, a plurality of through holes (cooling passage) 2A are formed. A cooling medium (such as cooling air or cooling water) is caused to flow through the plurality of through holes 2A, whereby the plurality of bipolar secondary batteries can be cooled.

In short, in assembled battery 100, negative electrode collector plate 21 and positive electrode collector plate 23 are arranged at every two bipolar secondary batteries adjacent in the stacking direction, of the plurality of bipolar secondary batteries. Negative electrode collector plate 21 (and positive electrode collector plate 23) also functions as heat radiating members as the cooling medium flows therein.

Therefore, in the present embodiment, it is unnecessary to connect a cooling tab to positive electrode collector plate 23 (or negative electrode collector plate 21) for cooling assembled battery 100. Specifically, assembled battery 100 does not have any portion protruding from positive electrode collector plate 23 (or negative electrode collector plate 21). Therefore, according to the present embodiment, the inside of assembled battery 100 can be cooled while the size of assembled battery 100 is made smaller.

When the cooling medium is caused to flow through the cooling passage, heat is exchanged between the heat radiating member and the cooling medium. Consequently, temperature at the outlet side of the cooling passage becomes higher than the temperature at the inlet side of the cooling passage. When the flow direction of the cooling medium between the plurality of negative electrode collector plates 21 and the plurality of positive electrode collector plates 23 (hereinafter also referred to as a "plurality of heat radiating members") is made the same (for example, when the cooling medium is caused to flow from the front side to the rear side of assembled battery 100 shown in FIG. 1), temperature tends to vary among the plurality of bipolar secondary batteries 4.

In the present embodiment, though the cooling medium flows in one direction (first direction) through the heat radiating members, the cooling medium flows in an opposite direction (second direction) through at least one of the plurality of heat radiating members. This alleviates temperature variation among the plurality of bipolar secondary batteries 4. Here, if the first direction is from the front side to the rear side of assembled battery 100, the second direction is from the rear side to the front side of assembled battery 100.

Particularly, it is preferred that the flow direction of cooling medium is alternately changed between the first and second directions between each of the plurality of heat radiating members as shown in FIG. 1. Causing the cooling medium to flow in this manner, temperature variation among the plurality of bipolar secondary batteries 4 can further be alleviated. Thus, temperature-dependent characteristic (such as SOC (State Of Charge)) may be made uniform among the plurality of bipolar secondary batteries 4.

Figure 2:
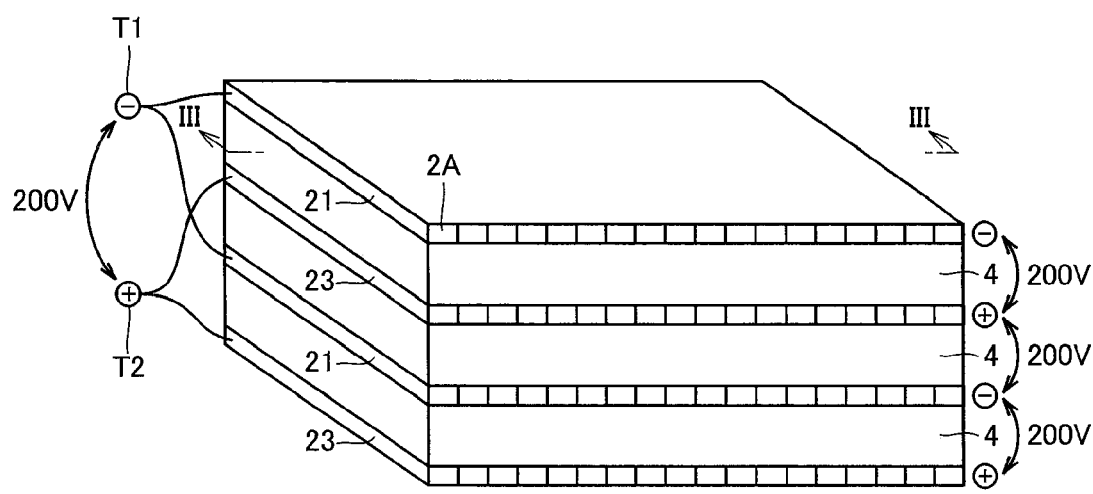
FIG. 2 shows a part extracted from an assembled battery 100 of FIG. 1.

FIG. 2 shows a part extracted from an assembled battery 100 of FIG. 1.

Referring to FIG. 2, the assembled battery includes three bipolar secondary batteries 4. By way of example, each bipolar secondary battery 4 outputs a voltage of about 200V.

FIG. 2 shows two negative electrode collector plates 21 and two positive electrode collector plates 23. Negative electrode collector plate 21 and positive electrode collector plate 23 are electrically connected to the negative electrode and positive electrode of bipolar secondary battery 4, respectively. Two negative electrode collector plates are connected to a terminal T1. Two positive electrode collector plates 23 are connected to a terminal T2. Thus, a voltage of 200V is output across terminals T1 and T2, when the assembled battery is discharged.

When the assembled battery is charged, a prescribed voltage (of about 200V, for example) is applied across terminals T1 and T2, whereby each bipolar secondary battery 4 is charged.

Figure 3:
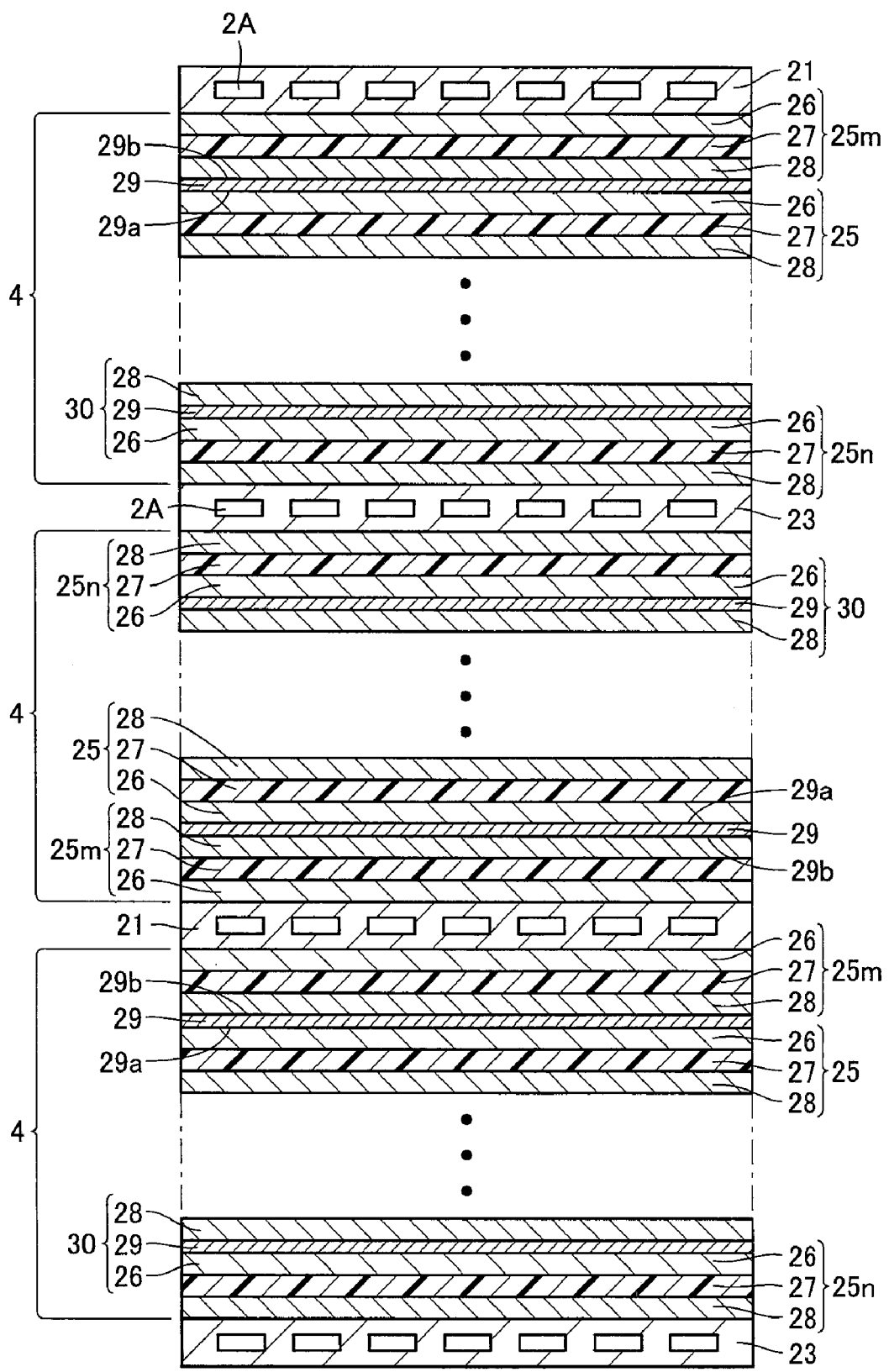
FIG. 3 is a cross-sectional view of the assembled battery taken along the line III-III of FIG. 2.

FIG. 3 is a cross-sectional view of the assembled battery taken along the line III-III of FIG. 2.

Referring to FIG. 3, each of the plurality of secondary batteries 4 includes a plurality of stacked electrode sheets 25. The stacking direction of the plurality of electrode sheets 25 is the same as the stacking direction of the plurality of bipolar secondary batteries 4.

Electrode sheet 25 consists of a positive electrode active material layer 28 serving as the positive electrode, a negative electrode active material layer 26 serving as the negative electrode, and an electrolyte layer 27 posed between positive electrode active material layer 28 and negative electrode active material layer 26. Electrolyte layer 27 is formed of a material having ion conductivity. Electrolyte layer 27 may be a solid electrolyte, or gelled electrolyte. By interposing electrolyte layer 27, smooth ion conduction between positive electrode active material layer 28 and negative electrode active material layer 26 becomes possible, improving output of bipolar secondary battery 120.

The plurality of electrode sheets 25 are stacked such that positive electrode active material layer 28 and negative electrode active material layer 26 oppose to each other at positions where the layers extend next to each other in the stacking direction. Between each of the plurality of electrode sheets 25, a sheet type collector foil 29 is provided. Positive electrode active material layer 28 is formed on one surface 29b and negative electrode active material layer 26 is formed on the other surface 29a, of collector foil 29. Positive electrode active material layer 28 and negative electrode active material layer 26 are formed, for example, by sputtering on the surfaces of collector foil 29.

A set of positive electrode active material layer 28, collector foil 29 and negative electrode active material layer 26 arranged between electrolyte layer 27 adjacent to each other in the stacking direction of electrode sheets 25 constitute a bipolar electrode 30. In bipolar secondary battery 4, both the positive electrode active material layer 28 serving as the positive electrode and the negative electrode active material layer 26 serving as the negative electrode are formed in one bipolar electrode 30.

The plurality of electrode sheets 25 include an electrode sheet 25m positioned on the side closest to a negative electrode collector plate 21 and an electrode sheet 25n positioned on the side closest to a positive electrode collector plate 23. Electrode sheet 25m is provided such that negative electrode active material layer 26 is arranged at the end on the side of negative electrode collector plate 21. Electrode sheet 25n is provided such that positive electrode active material layer 28 is arranged at the end on the side of positive electrode collector plate 23. Thus, negative electrode collector plate 21 is in contact with negative electrode active material layer 26 of electrode sheet 25m, and positive electrode collector plate 23 is in contact with positive electrode active material layer 28 of electrode sheet 25n.

In negative electrode collector plate 21 and positive electrode collector plate 23, a plurality of through holes 2A are formed to allow passage of the cooling medium.

When the bipolar secondary battery 4 is charged/discharged, a current flows in the direction of stacking of the plurality of bipolar electrodes 30. Consequently, heat builds up in bipolar secondary battery 4. Heat radiating members (positive electrode collector plate 23 and negative electrode collector plate 21) are provided at opposite ends in the stacking direction of the plurality of bipolar electrodes 30. The temperature of heat radiating members decrease as the cooling medium is caused to flow through the heat radiating members.

As described above, the length in the stacking direction of the plurality of bipolar electrodes (thickness of bipolar secondary battery 4) is significantly shorter than the length and width of the plane orthogonal to the stacking direction. Therefore, the heat generated in bipolar secondary battery 4 is transferred smooth to the heat radiating members at the opposite ends in the stacking direction of the plurality of bipolar electrodes 30. Thus, bipolar secondary battery 3 can be cooled efficiently.

Next, materials forming the bipolar secondary battery 4 shown in FIG. 3 will be described in detail. Collector foil 29 is formed, for example, of aluminum. Here, even if the active material layer provided on the surface of collector foil 29 contains solid polymer electrolyte, it is possible to ensure sufficient mechanical strength of collector foil 29. Collector foil 29, may be formed by providing aluminum coating on metal other than aluminum, such as copper, titanium, nickel, stainless steel (SUS) or an alloy of these metals.

Positive electrode active material layer 28 includes a positive electrode active material layer and a solid polymer electrolyte. Positive electrode active material layer 28 may contain a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the positive electrode active material, composite oxide of lithium and transition metal generally used in a lithium ion secondary battery may be used.

Examples of the positive electrode active material may include Li/Co based composite oxide such as $LiCoO_2$, Li/Ni based composite oxide such as $LiNiO_2$, Li/Mn based composite oxide such as spinel $LiMn_2O_4$, and Li/Fe based composite material such as $LiFeO_2$. Other examples are phosphate compound or sulfate compound of transition metal and lithium such as $LiFePO_4$; oxide or sulfide of transition metal such as $V_2O_5$, $MnO_2$, $TiS_2$, $MoS_2$ and $MoO_3$; $PbO_2$, AgO, NiOOH and the like.

The solid polymer electrolyte is not specifically limited and it may be any ion-conducting polymer. For example, polyethylene oxide (PEO), polypropylene oxide (PPO) or copolymer of these may be available. Such a polyalkylene oxide based polymer easily dissolves lithium salt such as $LiBF_4$, $LiPF_6$, $LiN(SO_2CF_3)_2$, or $LiN(SO_2C_2F_5)_2$. The solid polymer electrolyte is included in at least one of positive electrode active material layer 28 and negative electrode active material layer 26. More preferably, the solid polymer electrolyte is included both in positive electrode active material layer 28 and negative electrode active material layer 26.

As the supporting salt, $Li(C_2F_5SO_2)_2N$, $LiBF_4$, $LiPF_6$, $LiN(SO_2C_2F_5)_2$ or a mixture of these may be used. As the electron conduction assistant, acetylene black, carbon black, graphite or the like may be used.

Negative electrode active material layer 26 includes a negative electrode active material and a solid polymer electrolyte. Negative electrode active material layer 26 may contain a supporting salt (lithium salt) for improving ion conductivity, a conduction assistant for improving electron conductivity, NMP (N-methyl-2-pyrrolidone) as a solvent for adjusting slurry viscosity, AIBN (azobisisobutyronitrile) as a polymerization initiator or the like.

As the negative electrode active material, a material generally used in a lithium ion secondary battery may be used. If a solid electrolyte is used, however, it is preferred to use a composite oxide of carbon or lithium and metal oxide or metal, as the negative electrode active material. More preferably, the negative electrode active material is formed of a composite oxide of carbon or lithium and transition metal. Further preferably, the transition metal is titanium. Specifically, it is more preferred that the negative electrode active material is of a composite oxide of titanium oxide or titanium and lithium.

As the solid electrolyte forming electrolyte layer 27, by way of example, a solid polymer electrolyte such as polyethylene oxide (PEO), polypropylene oxide (PPO) or copolymer of these may be used. The solid electrolyte contains supporting salt (lithium salt) for ensuring ion conductivity. As the supporting salt, $LiBF_4$, $LiPF_6$, $LiN(SO_2CF_3)_2$, $LiN(SO_2C_2F_5)_2$ or a mixture of these may be used.

Specific examples of materials for positive electrode active material layer 28, negative electrode active material layer 26 and electrolyte layer 27 are listed in Tables 1 to 3. Table 1 shows specific examples when electrolyte layer 27 is of an organic solid electrolyte, Table 2 shows specific examples when electrolyte layer 27 is of an inorganic solid electrolyte, and Table 3 shows specific examples when electrolyte layer 27 is of a gel electrolyte.

TABLE 1

| Positive electrode material | Negative electrode material | Solid electrolyte | Remarks |
|---|---|---|---|
| $LiMn_2O_4$ | Li metal | P(EO/MEEGE) | electrolyte salt: $LiBF_4$ |
| — | Li metal | P(EO/PEG-22) | electrolyte salt: $LiN(CF_3SO_2)_2(LiTFSI)$ |
| $LiCoO_2$ | carbon | PVdF base | — |
| $LiCoO_2$ | Li metal | ether based polymer P(EO/EM/AGE) | electrolyte salt: LiTFSI<br>ion conducting material binder:<br>mix P(EO/EM) + $LiBF_4$ to positive electrode |
| $Li_{0.33}MnO_2$ | Li metal | P(EO/EM/AGE) | electrolyte salt: LiTFSI<br>ion conducting material binder: mix PEO-based solid polymer + LiTFSI to positive electrode |
| $Li_{0.33}MnO_2$ | Li metal | PEO base + inorganic additive | electrolyte salt: $LiClO_4$<br>ion conducting material:<br>mix KB + PEG + LiTFSI to positive electrode |
| — | — | PEG-PMMA + PEG-borate ester | electrolyte salt: LiTFSI, BGBLi |
| — | — | PEO base + 10mass % $0.6Li_2S + 0.4SiS_2$ | electrolyte salt: $LiCF_3SO_3$ |
| — | Li metal | PEO base + perovskite type $La_{0.55}Li_{0.35}TiO_3$ | electrolyte salt: $LiCF_3SO_3$ |
| Li metal | — | styrene/ethylene oxide-block-graft polymer(PSEO) | electrolyte salt: LiTFSI<br>ion conducting material:<br>mix KB + PVdF + PEG + LiTFSI to positive electrode |
| $LiCoO_2$ | Li metal | P(DMS/EO) + polyether cross link | — |
| $Li_{0.33}MnO_2$ | Li metal | prepolymer composition mainly consisting of urethane acrylate (PUA) | electrolyte salt: LiTFSI<br>ion conducting material:<br>mix KB + PVdF + PEG + LiTFSI to positive electrode |
| — | — | multibranched graft polymer (MMA + CMA + POEM) | electrolyte salt: $LiClO_4$ |
| $LiNi_{0.8}Co_{0.2}O_2$ | Li metal | PEO/multibranched polymer/filler based composite solid electrolyte (PEO + HBP + $BaTiO_3$) | electrolyte salt: LiTFSI<br>mix SPE + AB to positive electrode |
| — | — | PME400 + Group 13 metal alkoxide (as Lewis acid) | electrolyte salt: LiCl |
| — | — | matrix containing poly (N-methylvinylimidazoline) (PNMVI) | electrolyte salt: $LiClO_4$ |
| $LiCoO_2$ | Li metal | polymerize methoxy polyethylene glycol monomethyl meso acrylate using ruthenium complex by living radical polymerization, further polymerize with styrene | electrolyte salt: $LiClO_4$<br>positive electrode conducting material KB + binder PVdF |
| $LiCoO_2$ | Li metal | P(EO/EM) + ether based plasticizer | electrolyte salt: LiTFSI<br>positive electrode conducting material KB + binder PVdF |

TABLE 2

| Positive electrode material | Negative electrode material | Solid Electrolyte | Remarks |
|---|---|---|---|
| $LiCoO_2$ | In | $95(0.6Li_2S \cdot 0.4SiS_2) \cdot 5Li_4SiO_4$<br>($Li_2S$—$SiS_2$ based melt rapid cooled glass) | state: glass |
| — | — | $70Li_2S \cdot 30P_2S_5Li_{1.4}P_{0.6}S_{2.2}$ sulfide glass<br>($Li_2S$—$P_2S_5$ based glass ceramics) | state: glass<br>forming method: mechanochemical |
| — | — | $Li_{0.35}La_{0.55}TiO_3$(LLT)<br>(perovskite type structure) | state: ceramics<br>form solid electrolyte porous body, fill pores with active material sol |
| — | — | $80Li_2S \cdot 20P_2S_5$<br>($Li_2S$—$P_2S_5$ based glass ceramics) | state: glass<br>forming method: mechanochemical |
| — | — | $xSrTiO_3 \cdot (1-x)LiTaO_3$<br>(perovskite type oxide) | state: ceramics |
| $LiCoO_2$ | Li—In metal | $Li_{3.4}Si_{0.4}P_{0.6}S_4$<br>(thio-LISICON Li ion conductor) | state: ceramics |
| — | — | $(Li_{0.1}La_{0.3})_xZr_yNb_{1-y}O_3$<br>(perovskite type oxide) | state: ceramics |
| — | — | $Li_4B_7O_{12}Cl$ | state: ceramics<br>combine PEG as organic compound |
| — | — | $Li_4GeS_4$—$Li_3PS_4$ based crystal $Li_{3.25}Ge_{0.25}P_{0.75}S_4$<br>(thio-LISICON Li ion conductor) | state: ceramics |
| — | Li metal<br>In metal | $0.01Li_3PO_4$—$0.63Li_2S$—$0.36SiS_2$<br>(thio-LISICON Li ion conductor) | state: ceramics |
| $LiCoO_2 LiFePO_4$ | Li metal | $Li_3PO_{4-x}N_x$(LIPON) | state: glass |
| $LiMn_{0.6}Fe_{0.4}PO_4$ | $V_2O_5$ | (lithium phosphate oxynitride glass) | |
| $LiNi_{0.8}Co_{0.15}Al_{0.05}O_2$ | Li metal | $Li_3InBr_3Cl_3$<br>(rock salt type Li ion conductor) | state: ceramics |
| — | — | $70Li_2S \cdot (30-x)P_2S_5 \cdot xP_2O_5$<br>($Li_2S$—$P_2S_5$—$P_2O_5$ based glass ceramics) | state: glass |
| $LiCoO_2$ etc. | Li metal<br>Sn based oxide | $Li_2O$—$B_2O_3$—$P_2O_5$ base, $Li_2O$—$V_2O_5$—$SiO_2$ base, $Li_2O$—$TiO_2$—$P_2O_5$ base, LVSO etc. | state: glass |
| — | — | $LiTi_2(PO_3)_4$(LTP)<br>(NASICON type structure) | state: ceramics |

TABLE 3

| Positive electrode material | Negative electrode material | Polymer base | Remarks |
|---|---|---|---|
| Ni based collector | Li metal | acrylonitrile vinyl acetate (PAN-VAc based gel electrolyte) | solvent: EC + PC<br>electrolyte salt: $LiBF_4$, $LiPF_6$, $LiN(CF_3SO_2)_2$ |
| lithium electrode | lithium electrode | triethylene glycolmethyl methacrylate (polymethyl methacrylate (PMMA) based gel electrolyte) | solvent: EC + PC<br>electrolyte salt: $LiBF_4$ |
| $V_2O_5$/PPy composite body | Li metal | methyl methacrylate (PMMA gel electrolyte) | solvent: EC + DEC<br>electrolyte salt: $LiClO_4$ |
| Li metal | Li metal | PEO/PS polymer blend gel electrolyte | solvent: EC + PC<br>electrolyte salt: $LiClO_4$ |
| Li metal | Li metal | alkylene oxide based polymer electrolyte | solvent: PC<br>electrolyte salt: $LiClO_4$ |
| Li metal & $LiCoO_2$ | Li metal | alkylene oxide based polymer electrolyte | solvent: EC + GBL<br>electrolyte salt: $LiBF_4$ |
| Li metal | Li metal | polyolefin based base polymer | solvent: EC + PC<br>electrolyte salt: $LiBF_4$ |
| $Li_{0.36}CoO_2$ | Li metal | polyvinylidenefluoride (PVdF) + propylene hexafluoride (HFP) (PVdF-HFP gel electrolyte) | solvent: EC + DMC<br>electrolyte salt: $LiN(CF_3SO_2)_2$ |
| $LiCoO_2$ | Li metal | PEO based and acryl based polymer | solvent: EC + PC<br>electrolyte salt: $LiBF_4$ |
| Li metal | Li metal | trimethylol propane ethoxylate acrylate (ether based polymer) | solvent: PC<br>electrolyte salt: LiBETI, $LiBF_4$, $LiPF_6$ |
| — | — | EO-PO copolymer | electrolyte salt: LiTFSI, $LiBF_4$, $LiPF_6$ |
| — | — | poly aziridine compound | solvent: EC + DEC<br>electrolyte salt: $LIPF_6$ |
| — | PAS (polyacene) | PVdF-HFP gel electrolyte | solvent: PC, EC + DEC<br>electrolyte salt: $LiClO_4$, $Li(C_2F_5SO_2)_2N$ |
| — | — | urea based lithium polymer gel electrolyte | solvent: EC + DMC electrolyte salt: $LiPF_6$ |
| — | — | polyether/polyurethane based (PEO-NCO) gel electrolyte | solvent: PC<br>electrolyte salt: $LiClO_4$ |
| — | — | cross-linked polyalkylene oxide based gel polymer electrolyte | — |

It most cases, the electrolyte used in a secondary battery is liquid. By way of example, in a lead storage battery, dilute sulfuric acid is used as the electrolytic solution. In such a secondary battery, the electrolyte, positive electrode and negative electrode are housed in a tightly sealed bag, case or the like. Therefore, the heat generated in the secondary battery is once transmitted to the container and radiated out from the container. Specifically, in such a secondary battery, a container exists for housing the electrolyte (electrolytic solution) and, therefore, efficient cooling of the inside of secondary battery has been difficult.

On the contrary, in the present embodiment, the electrolyte of bipolar secondary battery 4 is solid or gel and, therefore, there is no container for housing the electrolyte. Accordingly, the heat generated inside the secondary battery is transmitted smooth to the heat radiating members (that is, negative electrode collector plate 21 and positive electrode collector plate 23). Therefore, according to the present embodiment, the inside of assembled battery can efficiently be cooled.

Further, positive electrode collector plate 23 and negative electrode collector plate 21 have some strength. In the present embodiment, each of the plurality of bipolar secondary batteries 4 is sandwiched by positive electrode collector plate 23 and negative electrode collector plate 21. When positive electrode collector plate 23 and negative electrode collector plate 21 are sandwiched by bipolar secondary batteries 4, a gap between positive electrode plate 23 and bipolar secondary battery 4 or between negative electrode collector plate 21 and bipolar secondary battery 4 can be eliminated. Thus, strength of assembled battery 100 can be ensured.

Next, exemplary applications of the assembled battery shown in FIGS. 1 to 3 as well as a specific example of the method of cooling assembled battery will be described.

Figure 4:
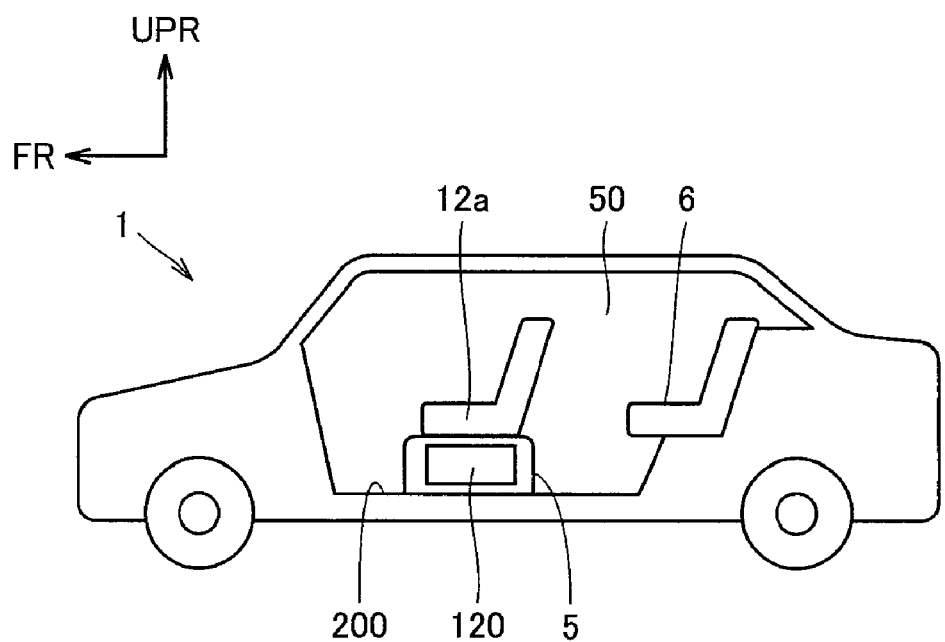
FIG. 4 is a schematic cross-sectional view showing an embodiment of a vehicle mounting the assembled battery in accordance with the present invention.

FIG. 4 is a schematic cross-sectional view showing an embodiment of a vehicle mounting the assembled battery in accordance with the present invention.

Figure 5:
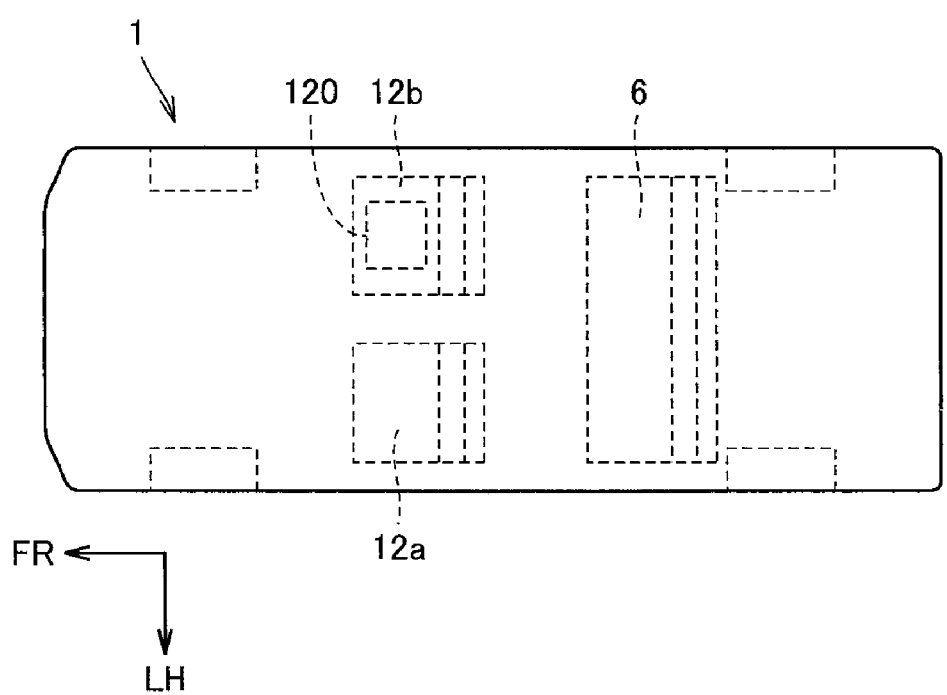
FIG. 5 is a schematic transparent plan view of the vehicle shown in FIG. 4.

FIG. 5 is a schematic transparent plan view of the vehicle shown in FIG. 4.

Referring to FIGS. 4 and 5, a vehicle 1 is, for example, an electric vehicle using a dischargeable electric power supply as a power source, or a hybrid vehicle using an internal combustion engine such as a gasoline engine or a diesel engine and a dischargeable electric power supply as the power sources. Assembled battery 100 shown in FIGS. 1 to 3 is installed as a power source of such a vehicle.

In a passenger space (vehicle interior) 50 of vehicle 1, front seats 12a and 12b (see FIG. 5) and a rear seat 6 are arranged. In the passenger space 50, battery pack 120 including assembled battery 100 and cooling mechanism shown in FIGS. 1 to 3 is arranged below front seat 12a. Battery pack 120 is surrounded by a cover 5 arranged below front seats 2a and 2b and a floor 200. Front seats 12a and 12b correspond to the "seat" of the vehicle in accordance with the present invention.

Battery pack 120 may be arranged below front seat 12b. It is easier to make a space for housing battery pack 120 below front seats 12a and 12b, than at other portions of vehicle 1. In most cases, a vehicle body consists of a portion that collapses and a portion that does not collapse but protects an occupant or occupants at the time of a crash. Specifically, by arranging battery pack 120 below front seat 2a (or front seat 2b), it becomes possible to protect the assembled battery against any shock, if the vehicle body is hard hit.

In FIG. 4, the direction represented by an arrow UPR is the direction to the ceiling of vehicle 1 (upward direction), and the direction represented by an arrow FR is the forward direction of vehicle 1 (direction of travel). In FIG. 5, the direction represented by an arrow LH is the direction to the left of the vehicle 1 (left side direction).

Figure 6:
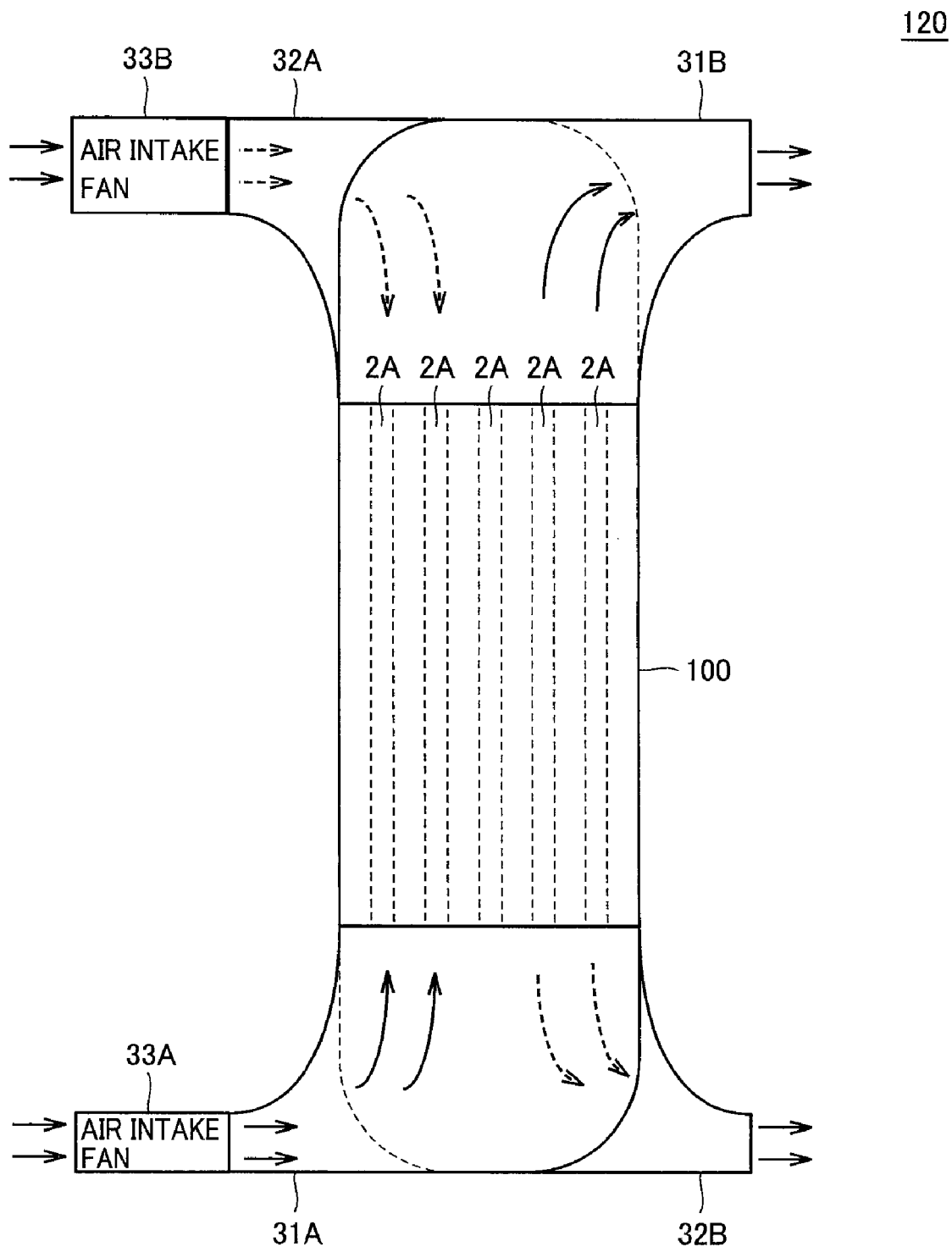
FIG. 6 is a top view schematically showing a structure of a battery pack 120 of FIGS. 4 and 5.

FIG. 6 is a top view schematically showing a structure of a battery pack 120 of FIGS. 4 and 5.

Figure 7:
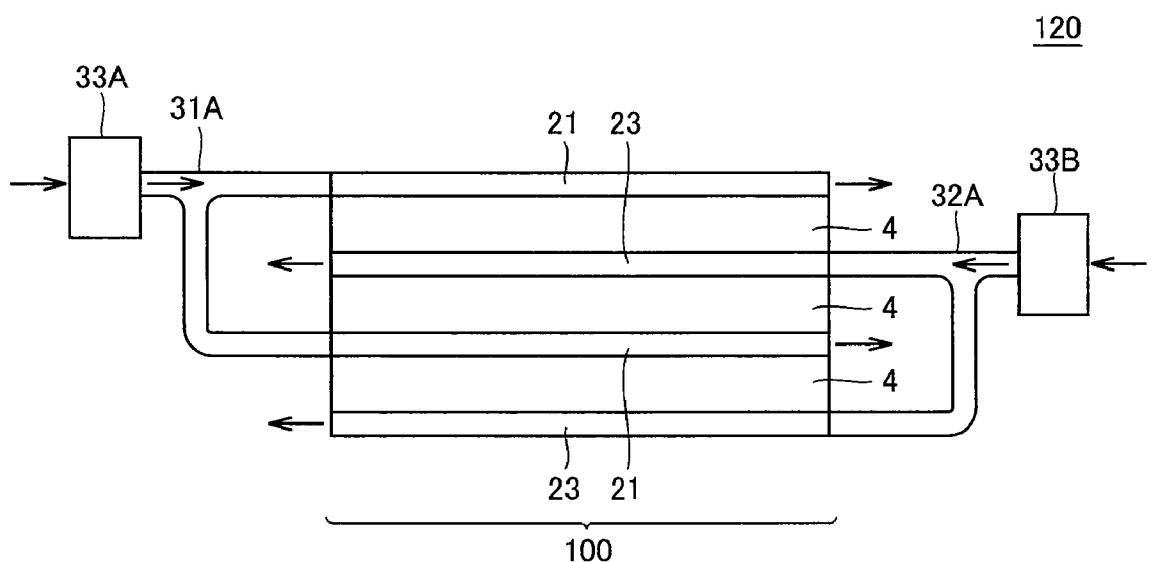
FIG. 7 is a side view schematically showing the structure of battery pack 120 of FIG. 6.

FIG. 7 is a side view schematically showing the structure of battery back 120 of FIG. 6.

Referring to FIGS. 6 and 7, battery pack 120 includes assembled battery 100, air intake ducts 31A and 32A, ventilation ducts 31B and 32B, and air intake fans 33A and 33B. For simplicity of the drawing, ventilation ducts 31B and 32B are not shown in FIG. 7.

Air intake fans 33A and 33B are respectively connected to air intake ducts 31A and 32A. When air intake fan 33A operates, cooling air is introduced through air intake duct 31A to through holes 2A, and the cooling air is exhausted through ventilation duct 31B. When air intake fan 33B operates, cooling air is introduced through air intake duct 32A to through holes 2A, and the cooling air is exhausted through ventilation duct 32B.

Here, as shown in FIG. 7, to negative electrode collector plate 21, the cooling air is introduced from air intake fan 33A through air intake duct 31A. To the heat radiating member inside positive electrode collector plate 23, the cooling air is introduced from air intake fan 33B through air intake duct 32A. Negative electrode collector plates 21 and positive electrode collector plates 23 are arranged alternately along the stacking direction of the plurality of bipolar secondary batteries 4. Therefore, between the radiating members adjacent to each other in the stacking direction of the plurality of bipolar secondary batteries 4, it is possible to cause the cooling air to flow in opposite directions. An arrangement is also possible in which the cooling air is fed from one air intake fan to negative electrode collector plates 21 and positive electrode collector plates 23, in place of air intake fans 33A and 33B.

As described above, according to Embodiment 1, the inside of assembled battery can be cooled while the size of assembled battery is made smaller.

Embodiment 2

Figure 8:
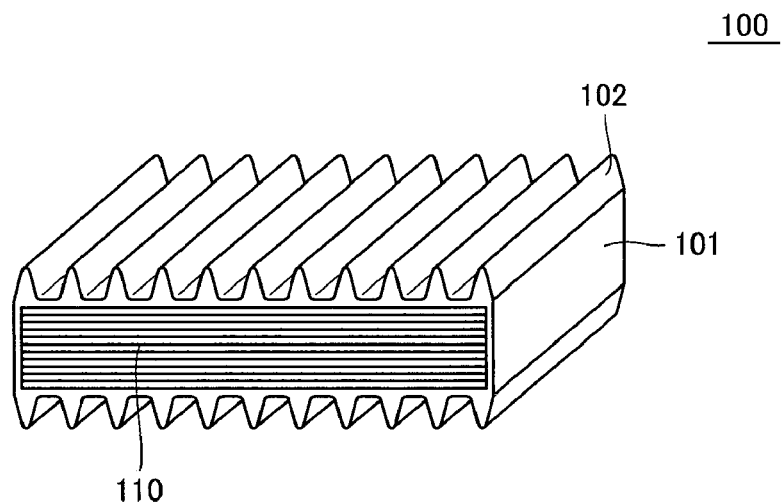
FIG. 8 shows an assembled battery in accordance with Embodiment 2.

FIG. 8 shows an assembled battery in accordance with Embodiment 2. Referring to FIG. 8, assembled battery 100 includes a casing 101 and a stacked type battery 110. Stacked type battery 110 is housed in casing 101. Stacked type battery 110 has the same structure as assembled battery 100 in accordance with Embodiment 1 and includes a plurality of bipolar secondary batteries and a plurality of heat radiating members. Therefore, further description related to the structure of stacked type battery 110 shown in FIG. 8 will not be repeated. According to Embodiment 2, as stacked type battery 110 is housed in casing 101, stiffness can be improved than the assembled battery of Embodiment 1.

On an outer wall of casing 101, a plurality of heat radiating fins 102 are provided. As a result, according to Embodiment 2, not only the inside of stacked type battery 110 but also the outside of stacked type battery 110 can be cooled and hence, cooling performance of assembled battery 100 as a whole can be improved.

Stacked type battery 110 is housed in casing 101 in a state pressed in the stacking direction of the plurality of bipolar secondary batteries, and sandwiched by two inner walls of casing 101 positioned above and below the stacked type battery 110. This enables binding of stacked type battery 110. Though not shown in FIG. 8, the surface of stacked type battery 110 is covered by an insulating film.

When stacked type battery 110 is charged/discharged, electrons/ions move inside bipolar secondary battery. At the time of charging, the bipolar secondary battery expands in the stacking direction of the plurality of bipolar electrodes (the expanded secondary battery returns to the original state at the time of discharge). Repeated charging/discharging leads to generation of a space between electrodes and variation in internal resistance, possibly degrading battery performance.

In Embodiment 2, casing 101 serves as a binding member binding stacked type battery 110. Therefore, variation in dimensional fluctuation experienced by the electrodes can be reduced, and degradation of battery performance can be prevented. Further, according to Embodiment 2, it is possible to bind the battery without using any member such as a binding plate or a binding band.

Embodiment 3

Figure 9:
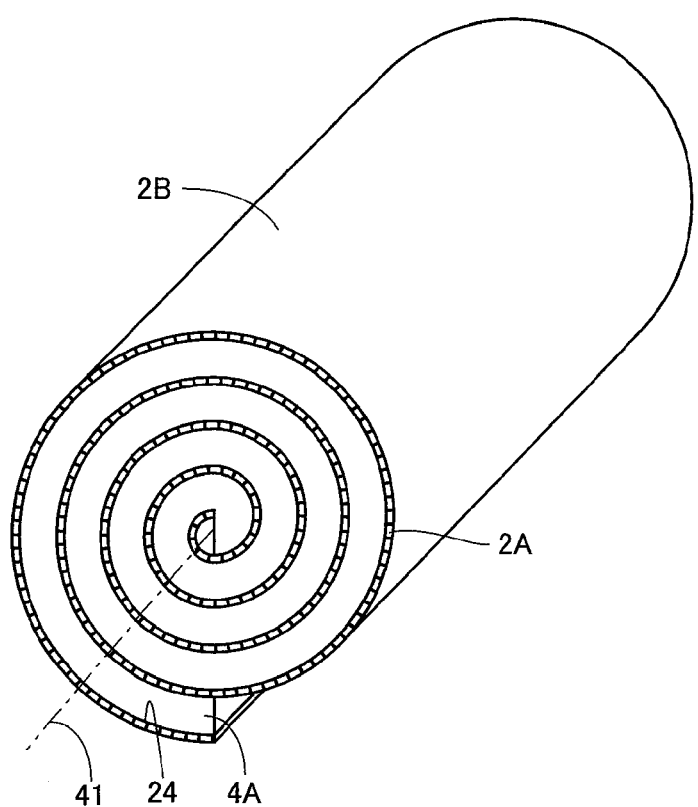
FIG. 9 is a perspective view showing an assembled battery in accordance with Embodiment 3 as a whole.

FIG. 9 is a perspective view showing an assembled battery in accordance with Embodiment 3 as a whole.

Referring to FIG. 9, assembled battery 100A includes a bipolar secondary battery 4A, an insulating film 24, and a heat radiating member 2B. Insulating film 24 is provided between bipolar secondary battery 4 and heat radiating member 2B. In heat radiating member 2B, a plurality of through holes 2A are formed to allow passage of cooling medium. For better heat radiation, heat radiating member 2B is preferably formed of metal.

Assembled battery 100A has a columnar shape extending along a central axis 41. Assembled battery 100A is formed to have a circular cross section when cut along a plane orthogonal to the central axis 41. It is noted that assembled battery 100A may be formed to have an elliptical or oval cross section.

Further, cooling of assembled battery 100A is attained by passing the cooling air fed from a cooling fan (not shown in FIG. 9) to through holes 2A in heat radiating member 2B.

Figure 10:
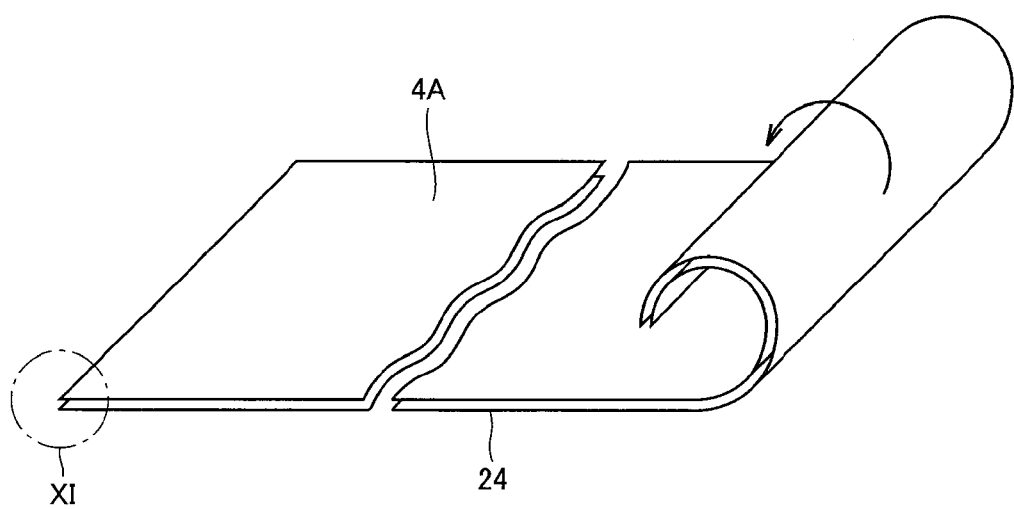
FIG. 10 is a perspective view showing an exemplary method of manufacturing assembled battery 100A shown in FIG. 9.

FIG. 10 is a perspective view showing an exemplary method of manufacturing assembled battery 100A shown in FIG. 9.

Referring to FIG. 10, bipolar secondary battery 4A and insulating film 24 are wound a number of times. Bipolar secondary battery 4A and insulating film 24 have rectangular thin film shapes. Heat radiating member 2B is formed beforehand to have the shape shown in FIG. 9 (spiral around central axis 41) by a metal mold or the like. By inserting the wound bipolar secondary battery 4 and insulating film 24 into the heat radiating member 2B, assembled battery 100A is formed.

It is also possible to wind heat radiating member 2B together with bipolar secondary battery 4A and insulating film 24, to form assembled battery 100A. In order to improve strength of assembled battery 100A, it is preferred to use heat radiating member formed in a spiral.

Figure 11:
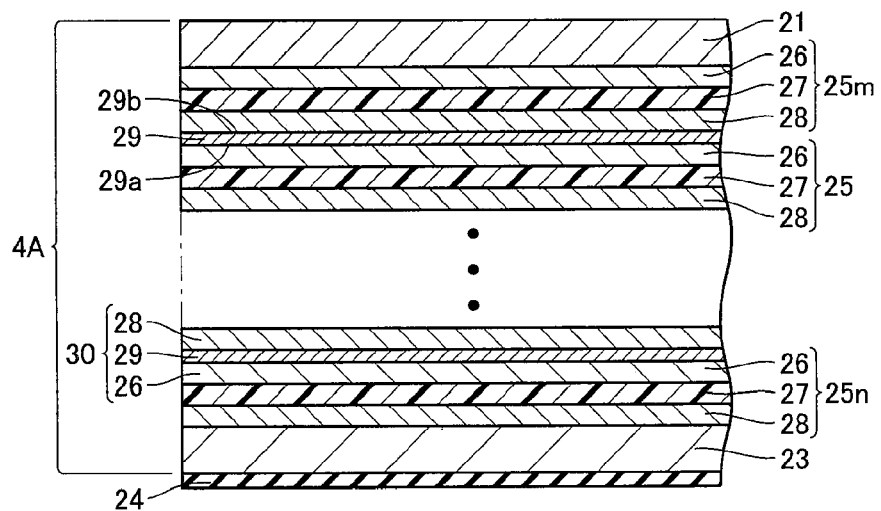
FIG. 11 is a cross-sectional view showing in enlargement a portion surrounded by two-dotted line XI of FIG. 10.

FIG. 11 is a cross-sectional view showing in enlargement a portion surrounded by two-dotted line XI of FIG. 10.

Referring to FIGS. 11 and 3, bipolar secondary battery 4A is different from bipolar secondary battery 4 in that it further includes negative electrode collector plate 21 and positive electrode collector plate 23. Structure of other portions of bipolar secondary battery 4A is the same as the structure of corresponding portions of bipolar secondary battery 4 and, therefore, description thereof will not be repeated.

The plurality of electrode sheets 25 include an electrode sheet 25m arranged on the innermost side and an electrode sheet 25n arranged on the outermost side when the plurality of electrode sheets 25 are wound. Electrode sheet 25m is provided with negative electrode active material layer 26 arranged on an inner circumferential side end. Electrode sheet 25n is provided with positive electrode active material layer 28 arranged on an outer circumferential side end. Negative electrode collector plate 21 is stacked to be in contact with negative electrode active material layer 26 on electrode sheet 25m. Positive electrode collector plate 23 is stacked to be in contact with positive electrode active material layer 28 on electrode sheet 25n.

Insulating film 24 is provided to be in contact with negative electrode collector plate 23 (in FIG. 11, insulating film 24 is in contact with positive electrode collector plate 23). Outside the insulating film 24, heat radiating member 2B is provided. Specifically, in Embodiment 3, heat radiating member 2B is provided along that one of the plurality of bipolar electrodes 30 which is arranged on one end along the stacking direction of the plurality of bipolar electrodes.

Further, when the assembled battery is formed as shown in FIG. 9, short circuit between positive electrode collector plate 23 and negative electrode collector plate 21, that is, electrical connection between positive electrode collector plate 23 and negative electrode collector plate 21 by heat radiating member 2B, can be prevented by insulating film 24.

Negative electrode collector plate 21 and positive electrode collector plate 23 may not be included in bipolar secondary battery 4.

As described above, bipolar secondary battery 4A is formed as a thin film. By making longer the length of the thin film, battery capacity can be increased. According to Embodiment 3, by winding the thin film, a battery having small size and large capacity can be realized. Further, while it is necessary to cut the thin film shown in FIG. 10 in a prescribed size and to stack the cut films one after another in order to manufacture the bipolar secondary battery of Embodiment 1, the assembled battery of Embodiment 3 can be manufactured in a simpler manner than Embodiment 1.

Further, even at a portion near the central axis 41 of assembled battery 100A, heat radiation is promoted by causing the cooling medium to flow through heat radiating member 2B. Specifically, according to Embodiment 3, the assembled battery formed by winding bipolar secondary battery can appropriately be cooled.

As described above, according to Embodiment 3, the inside of assembled battery can be cooled while the size of assembled battery is made smaller.

Embodiment 4

Figure 12:
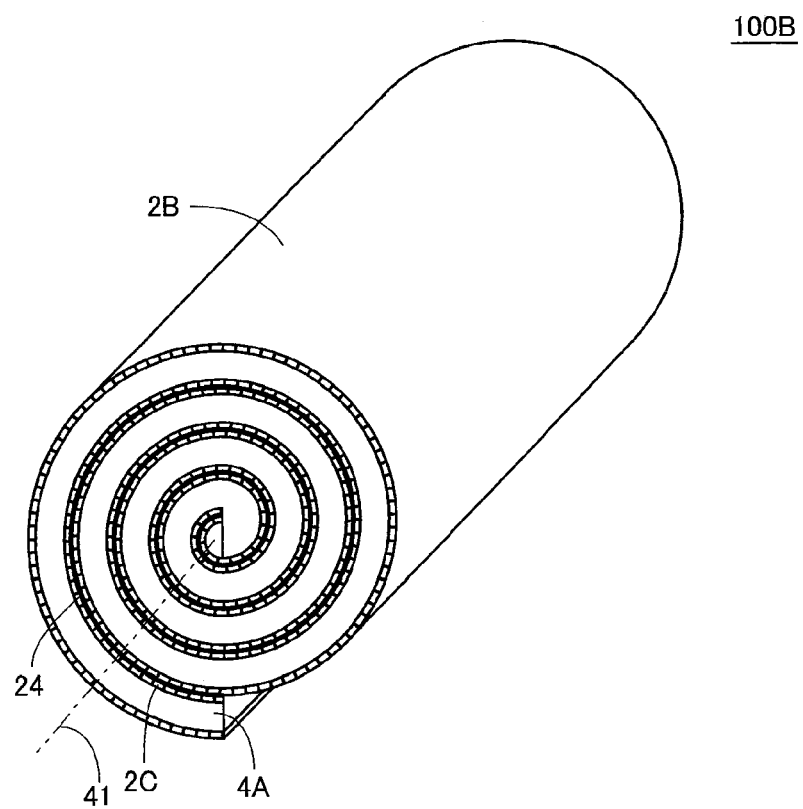
FIG. 12 is a perspective view showing an assembled battery in accordance with Embodiment 4 as a whole.

FIG. 12 is a perspective view showing an assembled battery in accordance with Embodiment 4 as a whole.

Referring to FIGS. 12 and 9, difference between assembled battery 100B and assembled battery 100A will be described. First, assembled battery 100B additionally includes a heat radiating member 2C. Further, in assembled battery 100B, between heat radiating members 2B and 2C, insulating film 24 is provided. In these points, assembled battery 100B is different from assembled battery 100A. Other portions of assembled battery 100B are the same as the corresponding portions of assembled battery 100A and, therefore, description thereof will not be repeated.

Cross-sectional structure of bipolar secondary battery 4A is the same as that shown in FIG. 11 and, therefore, description thereof will not be repeated. In Embodiment 4, heat radiating member 2B is provided on the outside of positive electrode collector plate 23 of bipolar secondary battery 4 shown in FIG. 11, and heat radiating member 2C is provided on the outside of negative electrode collector plate 21.

Specifically, in Embodiment 4, heat radiating member 2B is provided on that one of the plurality of bipolar electrodes 30 which is arranged on one end in the stacking direction of the plurality of bipolar electrodes, and heat radiating member 2C is provided along that one of the bipolar electrodes 30 which is arranged on the other end.

Further, cooling of assembled battery 100B is attained, for example, by passing the cooling air fed from a cooling fan (not shown in FIG. 12) through heat radiating members 2B and 2C.

The method of manufacturing assembled battery 100B is the same as that of assembled battery shown in FIG. 10. Heat radiating members 2B and 2C and insulating film 24 are integrated beforehand and formed to have a spiral shape. Then bipolar secondary battery 4A in the thin film shape is wound a number of times. Then, the bipolar secondary battery 4A is inserted to the gap between heat radiating members 2B and 2C shown in FIG. 12, whereby assembled battery 100B is formed. It is also possible to wind heat radiating members 2B and 2C, insulating film 24 and bipolar secondary battery 4A stacked together, to form assembled battery 100B.

In Embodiment 4, positive electrode collector plate 23 is in direct contact with heat radiating member 2B. In Embodiment 3, insulating film 24 is provided between positive electrode collector plate 23 and heat radiating member 2B. Specifically, in Embodiment 4, the insulating-film does not exist between the collector plate and the heat radiating member and, therefore, heat radiating performance of the assembled battery can be improved than in Embodiment 3. Both in Embodiments 3 and 4, negative electrode collector plate 21 is in contact with the heat radiating member. In Embodiment 3, the heat radiating member is heat radiating member 2B and in Embodiment 4, it is heat radiating member 2C.

As described above, by Embodiment 4, heat radiation of the assembled battery can be improved than in Embodiment 3.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:
1. An assembled battery, comprising:
  a plurality of secondary batteries stacked together, each including
  a plurality of bipolar electrodes stacked in the same direction as the stacking direction of said plurality of secondary batteries, each having a positive electrode formed on a first main surface and a negative electrode formed on a second main surface, and
  a plurality of electrolytes provided for every two adjacent ones of said plurality of bipolar electrodes, and arranged between said positive electrode of one of said two adjacent bipolar electrodes and said negative electrode of the other one of said two adjacent bipolar electrodes; and
  a heat radiating member arranged to form a first cooling passage allowing flow of a cooling medium, between at least one pair of adjacent first and second secondary batteries, among said plurality of secondary batteries, and
  another heat radiating member arranged to form a second cooling passage allowing flow of a cooling medium, between said second secondary battery and a third secondary battery positioned opposite to said first secondary battery with respect to said second secondary battery and adjacent to said second secondary battery among said plurality of secondary batteries; wherein
  said heat radiating member is arranged relative to a cooling apparatus supplying such that said cooling medium from said cooling apparatus flows through the first cooling passage in a first direction, and said another heat radiating member is arranged relative to said cooling apparatus such that said cooling medium from said cooling apparatus flows through the second cooling passage in a second direction, opposite to said first direction.

2. The assembled battery according to claim 1, wherein said heat radiating member and said another heat radiating member are electrically conductive; and
said positive electrodes of said first and second secondary batteries, or said negative electrodes of said first and second secondary batteries are electrically connected by said heat radiating member, and
said positive electrodes of said second and third secondary batteries, or said negative electrodes of said second and third secondary batteries are electrically connected by said another heat radiating member.

3. The assembled battery according to claim 1, further comprising
a casing housing said plurality of secondary batteries, said heat radiating member and said another heat radiating member; wherein
a plurality of heat radiating fins are provided on an outer wall of said casing.

4. The assembled battery according to claim 1, wherein said plurality of electrolytes are solid electrolyte or gelled electrolyte.

5. A vehicle, comprising:
a seat arranged in a vehicle interior; and
an assembled battery arranged below said seat, including
a plurality of secondary batteries stacked together, each of said plurality of secondary batteries having
a plurality of bipolar electrodes stacked in the same direction as the stacking direction of said plurality of secondary batteries, each having a positive electrode formed on a first main surface and a negative electrode formed on a second main surface, and
a plurality of electrolytes provided for every two adjacent ones of said plurality of bipolar electrodes, and arranged between said positive electrode of one of said two adjacent bipolar electrodes and said negative electrode of the other one of said two adjacent bipolar electrodes; and
said assembled battery further including
a heat radiating member arranged to form a first cooling passage allowing flow of a cooling medium, between at least one pair of adjacent first and second secondary batteries, among said plurality of secondary batteries, and
another heat radiating member arranged to form a second cooling passage allowing flow of a cooling medium, between said second secondary battery and a third secondary battery positioned opposite to said first secondary battery with respect to said second secondary battery and adjacent to said second secondary battery among said plurality of secondary batteries; wherein
said heat radiating member is arranged relative to a cooling apparatus supplying said cooling medium such that said cooling medium from said cooling apparatus flows through the first cooling passage in a first direction, and
said another heat radiating member is arranged relative to said cooling apparatus such that said cooling medium from said cooling apparatus flows through the second cooling passage in a second direction, opposite to said first direction.

6. The vehicle according to claim 5, wherein
said heat radiating member and said another heat radiating member are electrically conductive; and
said positive electrodes of said first and second secondary batteries, or said negative electrodes of said first and second secondary batteries are electrically connected by said heat radiating member, and
said positive electrodes of said second and third secondary batteries, or said negative electrodes of said second and third secondary batteries are electrically connected by said heat radiating member.

7. The vehicle according to claim 5, wherein
said assembled battery further includes
a casing housing said plurality of secondary batteries, said heat radiating member and said another heat radiating member; and
a plurality of heat radiating fins are provided on an outer wall of said casing.

8. The vehicle according to claim 5, wherein said plurality of electrolytes are solid electrolyte or gelled electrolyte.

* * * * *

UNITED STATES PATENT AND TRADEMARK OFFICE
CERTIFICATE OF CORRECTION

PATENT NO. : 7,997,367 B2  
APPLICATION NO. : 12/294749  
DATED : August 16, 2011  
INVENTOR(S) : Yoshiyuki Nakamura Page 1 of 1

It is certified that error appears in the above-identified patent and that said Letters Patent is hereby corrected as shown below:

| Column | Line | |
|---|---|---|
| 16 | 65 | After "apparatus" delete "supplying". |

Signed and Sealed this  
Twenty-eighth Day of February, 2012

David J. Kappos  
*Director of the United States Patent and Trademark Office*